J. H. COBURN, dec'd,

G. DRAPER and E. A. THISSELL, assignees, by mesne assignments.

Shuttle for Looms.

No. 8,809. Reissued July 15, 1879.

Witnesses.

L. F. Connor

N. E. Whitney.

Inventor.

John H. Coburn Assr to

George Draper and Earl A. Thissell by Crosby & Gregory Attys

N. PETERS, PHOTO-LITHOGRAPHER, WASHINGTON, D. C.

UNITED STATES PATENT OFFICE.

GEORGE DRAPER, OF HOPEDALE, AND EARL A. THISSELL, OF LOWELL, MASSACHUSETTS, ASSIGNEES, BY MESNE ASSIGNMENTS, OF JOHN H. COBURN, DECEASED.

IMPROVEMENT IN SHUTTLES FOR LOOMS.

Specification forming part of Letters Patent No. 97,882, dated December 14, 1869; Reissue No. 8,809, dated July 15, 1879; application filed March 7, 1879.

DIVISION B.

*To all whom it may concern:*

Be it known that JOHN H. COBURN, formerly of Lowell, in the county of Middlesex and State of Massachusetts, but now deceased, invented certain new and useful Improvements in Shuttles for Looms, of which the following is a full, clear, and exact description, reference being had to the accompanying drawings, forming part of this specification, in which—

Figure 1:
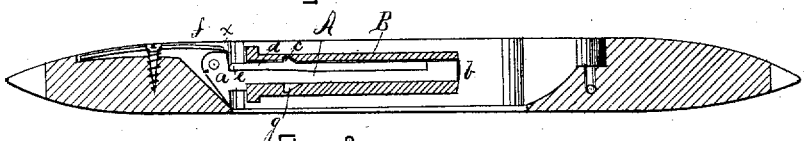
Figure 2:
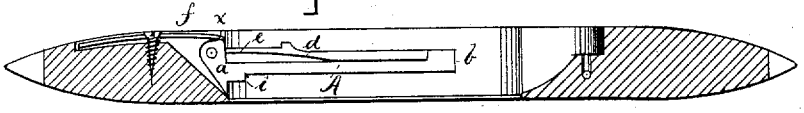
Figure 3:
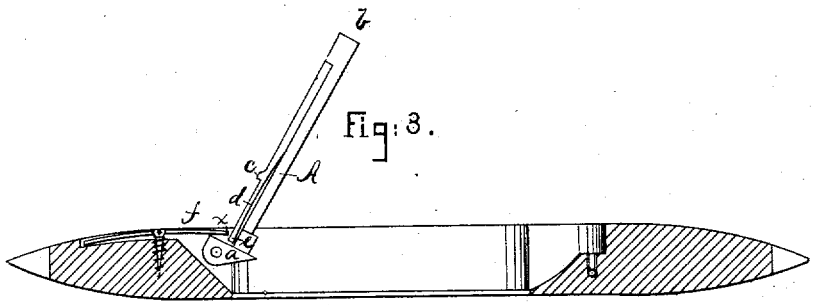
Figure 4:
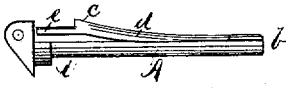

Figures 1 and 2 are central longitudinal sections of shuttles, the former figure showing a filling-bobbin upon its spindle; Fig. 3, a similar section with the spindle raised; Fig. 4, the spindle shown in Figs. 1, 2, and 3 detached from the shuttle; and Fig. 5, the particular spindle upon which the claim in this division of this patent is based.

Figs. 1 to 4, inclusive, show a shuttle-spindle, A, provided with a spring, *d*, having a bobbin-holding projection, *c*, located near the free end *e* of the spring, the said holding-projection serving to enter a groove, *g*, made within the interior of the bobbin B, and hold it in place upon the spindle, except when the spring *d* is borne toward the spindle by coming in contact with the top plate or top spring, *f*, as in Fig. 3.

The parts so far described form the subject-matter of another division of the reissue of this patent.

Figure 5:
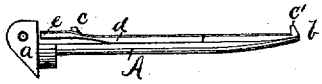

In practice it has been found that the spring *d*, made sufficiently stiff at its free end *e*, when left free to move outwardly, as in Figs. 1 and 5, will act to maintain the bobbin centrally within the shuttle.

To prevent the possibility of the bobbin moving longitudinally upon the spindle until the spring is depressed, the rigid end of the spindle in this present division of this invention is provided with a projection, *c'*, which is so placed as to engage with or hook over the end of the bobbin, it being so forced into holding position with the end of the bobbin by the action of spring *d*, which, as it raises the rear end of bobbin, forces its forward end down behind, and so as to be engaged by, the projection at the free end of the spindle. This spring *d*, by its friction within the bobbin at its base, prevents it from rotating on the spindle when the filling is being taken off during weaving.

A projection at the end of a spindle is not herein broadly claimed; but prior to this invention it is not known that a shuttle-spindle provided with a projection at its free end has ever been provided with a yielding spring having its free end located at the head of the shuttle-bobbin, the said spring being free to expand within the interior of the bobbin at its base next the head of the spindle.

We claim—

In a loom-shuttle, a spindle provided with a spring adapted to expand and hold the bobbin within it at its base, and with a projection located at the end of the spindle, to act upon the end of a bobbin and prevent its removal from the spindle.

GEORGE DRAPER.
EARL A. THISSELL.

Witnesses:
G. W. GREGORY,
L. F. CONNOR.